United States Patent [19]
Zhang et al.

[11] Patent Number: 5,236,588
[45] Date of Patent: Aug. 17, 1993

[54] ASYMMETRIC POLYMER MEMBRANE AND PREPARATION THEREOF

[75] Inventors: Husheng Zhang, Sakura; Takanori Anazawa, Sakura; Kazunari Sakai, Chiba, all of Japan

[73] Assignee: Dainippon Ink and Chemicals, Inc., Itabashi, Japan

[21] Appl. No.: 777,706

[22] Filed: Oct. 18, 1991

[30] Foreign Application Priority Data

Oct. 18, 1990 [JP] Japan .................... 2-277912

[51] Int. Cl.⁵ .............................. B01D 67/00
[52] U.S. Cl. ........................... 210/500.35; 264/41; 264/45.1; 264/DIG. 48; 264/DIG. 62
[58] Field of Search ............ 210/500.35, 500.27, 210/500.21, 500.34; 264/41, 45.1, DIG. 48, DIG. 62

[56] References Cited

U.S. PATENT DOCUMENTS

| | | |
|---|---|---|
| 3,615,024 | 10/1971 | Michaels . |
| 3,926,864 | 12/1975 | Hodgdon, Jr. . |
| 4,659,470 | 4/1987 | Caneba et al. . |
| 4,775,474 | 10/1988 | Chau et al. ............... 210/500.54 |

FOREIGN PATENT DOCUMENTS

| | | |
|---|---|---|
| 2301552 | 7/1973 | Fed. Rep. of Germany . |
| 2301553 | 7/1973 | Fed. Rep. of Germany . |
| 22116306 | 7/1972 | France . |
| 2406469 | 5/1979 | France . |
| 2124973 | 2/1984 | United Kingdom . |

OTHER PUBLICATIONS

Gerald B. Tanny, Ph. D., "The High Surface Area--Low Driving Force Alternative in Gas Separation", Proc. 4th Ann. Membrane Technology Planning Conference, pp. 231–243 (1986).

Derwent Abtract, No. 88-1124357, Section Ch, week 8818 of JP 63-069845, Mar. 29, 1988, (Dainippon Printing Co. Ltd.).

Primary Examiner—Frank Sever
Attorney, Agent, or Firm—Armstrong, Westerman, Hattori, McLeland & Naughton

[57] ABSTRACT

An asymmetric polymer membrane is disclosed characterized by being formed by irradiating a monomer and/or an oligomer polymerizable with an energy ray and having a pore diameter distribution in the thickness direction of the membrane, a ratio of a permeability flux of oxygen to nitrogen of 0.9–1.1, and communicating pores.

8 Claims, 3 Drawing Sheets

ASYMMETRIC POLYMER MEMBRANE AND PREPARATION THEREOF

BACKGROUND OF THE INVENTION

1. Field of the Invention

The present invention relates to a porous membrane such as an ultrafiltration membrane, a reverse osmosis membrane, a microfiltration membrane, etc., used for the purpose of filtration and separation of proteins, colloids, bacteria, viruses, salts, etc., in various separation processes in the food industry, pharmaceutical industry, and electronics industry, and in waste water treatment, artificial organs, purification of fresh water from sea water, etc., and in addition relates to the preparation of such a membrane.

2. Prior Art

As a method for preparing porous membranes, there has been a so-called wet process in which a polymer is dissolved in a solvent and a transformation procedure from a sol to a gel was utilized, as well as a method in which both a polymer compound and a material which were extractable by a nonsolvent were dissolved in a solvent suitable for both compounds, and after a film was made by evaporating the solvent, the film was extracted with the non-solvent.

However, in these methods, not only were there problems in that the production speed was slow, but also it was necessary to prepare a polymer solution, and it was impossible to obtain a porous membrane having excellent strength, heat resistance and chemical resistance.

In order to solve these problems, a membrane with a cross-linked structure was prepared. As a method for making this possible, in Japanese Patent Publications No. 34,329/1981 and No. 65,220/1988, a method was described for preparation of a porous membrane with a cross-linked structure in which a polymerizable monomer and/or oligomer were polymerized in the presence of a non-solvent which acted as a solvent for the monomer and/or oligomer, and did not swell a polymer made of these monomers. Furthermore, in Japanese Laid Open Patent No. 107,062/1974, an asymmetric membrane was described characterized by the membrane consisting of a covalently cross-linked vinyl polymer.

However, even though a porous membrane with excellent strength, heat resistance, and chemical resistance could be obtained with high production speed by the method of Japanese Patent Publications No. 34,329/1981 and No. 65,220/1988, since a porous membrane with a uniform pore diameter distribution in the cross-sectional direction of the membrane was obtained, in order to obtain a porous membrane with an arbitrary filtering separability, it was necessary to select membrane forming conditions in very narrow ranges. In addition, when filtering separation was performed by using the porous membrane, there were problems in that the permeation speed of the filtrate was extremely low and fouling of the membrane occurred easily. Furthermore, the method of Japanese Patent Publication No. 65,220/1987 was restricted to a method for preparation of a finely porous membrane with a fine pore dimension of 0.02-15 micrometers and without the capability of molecular weight cut-off.

In addition, in the Proceedings of the Fourth Annual Membrane Technology/Planning Conference 231 (1986), there was given a description of an asymmetric polymer membrane obtained by irradiating a homogeneous polymerizable solution in which a monomer and/or an oligomer were polymerizable by irradiation by an energy ray, and a non-solvent which acted as a solvent for the monomer and/or the oligomer and which did not swell or dissolve a polymer produced of the monomer and/or oligomer cured by an energy ray. However, in this reference, only a description of a gas separation membrane with a ratio of permeation of oxygen to nitrogen of 2.9-4.2 was given; that is, one having no pores which communicate with one another which could let a liquid pass through, and no description was given of a practical method for preparation thereof.

In addition, in the method of Japanese Laid Open Patent Publication No. 107,062/1974, as this asymmetric membrane was prepared by exploiting the freezing of a solvent (hereinbelow described as a "freezing method"), the thickness of a layer with a smaller pore diameter than that of the other parts in the thickness direction of the membrane (hereinbelow described as a dense layer) was 50 micrometers or greater, and this resulted in the filtering rate being very low; and the pore diameter of a layer with a larger pore diameter than that of either part in the thickness direction of the membrane, (hereinbelow described as a "porous supporting layer") and resulted in a membrane with insufficient membrane strength. This is not practical.

SUMMARY OF THE INVENTION

It is therefore a purpose of the present invention to provide an asymmetric polymer membrane which can be produced at a high speed, and with which an arbitrary filtering separability is easily obtained as the membrane has pore diameter distribution in the thickness direction of the membrane, and has pores which communicate with each other which can allow a liquid to pass through, which has not only extremely high or good filtering speed but also high molecular weight cut-off ability, which resists fouling and which exhibits excellent strength, heat resistance, and chemical resistance due to a cross-linked structure. It is another purpose to offer a method for preparation thereof.

The present inventors have performed extensive research to solve the above-described problems, and the present invention is the results of their efforts.

That is, the present invention offers an asymmetric polymer membrane formed by irradiating a monomer and/or an oligomer which are polymerizable by irradiation with an energy ray; the membrane having a pore diameter distribution in the depth of the membrane and a ratio of permeation flux of oxygen/nitrogen (hereinbelow abbreviated as a "separation factor") of 0.9-1.1 and with pores which communicate with each other; and a method for preparation thereof. The present invention furthermore offers an asymmetric polymer membrane formed by irradiating a monomer and/or an oligomer which are polymerizable by irradiation with energetic radiation. The asymmetric polymer membrane has an asymmetric pore diameter distribution in the depth of the membrane, and in which the thickness of its dense layer is 5 micrometers or less, the thickness of its porous supporting layer is 0.1-20 micrometers. When the diameter of the pores in the dense layer is 0.0005-0.015 micrometer, the membrane has a molecular weight cut-off ability; when the pore diameter of the dense layer is 0.02-20 micrometers, the membrane does not have a molecular weight cut-off ability. The present invention offers a method for preparation thereof.

A monomer and/or an oligomer of the present invention can be used as a homogeneous polymerizable solution by mixing with a non-solvent which acts as a solvent for the monomer and/or the oligomer, but does not swell or dissolve a polymer formed of the monomer and/or oligomer. In addition, it is possible to incorporate a second solvent which swells or dissolves a polymer formed of the monomer and/or oligomer in the homogeneous polymerizable solution.

An asymmetric polymer membrane with a pore diameter distribution in the thickness direction of the membrane can be obtained by polymerizing the homogeneous polymerizable solution by irradiating it with energetic radiation after a part of the non-solvent and/or the solvent is evaporated from the homogeneous polymerizable solution.

In addition, an asymmetric polymer membrane with a pore diameter distribution in the cross-sectional direction of the thickness of the membrane can be obtained by polymerizing the homogeneous polymerizable solution by irradiating with energetic radiation under a temperature gradient in the thickness direction of the membrane.

As an asymmetric polymer membrane of the present invention has a pore diameter distribution in the thickness direction of the membrane and communicating holes capable of allowing a liquid to pass through, an arbitrary filtering separator can be easily obtained in which the filtering speed is high and in which fouling is unlikely to occur. In addition, as it has a cross-linked structure, strength, heat resistance, and the chemical resistance of the membrane are excellent. Furthermore, there exists an advantage of high production speed.

In addition, in comparison with conventional wet methods and other methods for preparing asymmetric membranes, the method of preparation of the present invention is such that chemical modifications of the membrane are easy to perform; a cross-linked structure can be introduced in the membrane; the production speed is high as the phase separation is substantially and spontaneously completed; use of a high boiling polar solvent, such as dimethylformamide, the waste treatment of which is difficult, can be avoided; and, in comparison to such methods for introducing a cross-linked structure by cross-linking the film of the thermoplastic polymer by radiation, etc., has such features that the production speed is high; an apparatus on a large scale is unnecessary; the range of selection of polymers is wide; and design of the cross-linking density and cross-linking structure are easy to produce.

As monomers used for the present invention, monofunctional monomers such as ethyl (meth)acrylate, hydroxyethyl (meth)acrylate, n-butyl (meth)acrylate, hexyl (meth)acrylate, 2-ethylhexyl (meth)acrylate, phenyl (meth)acrylate, phenylcellosolve (meth)acrylate, n-vinylpyrrolidone, isobornyl (meth)acrylate, dicyclopentenyl (meth)acrylate and dicyclopentenyloxyethyl (meth)acrylate, difunctional monomers such as diethylene glycol di(meth)acrylate, neopentyl glycol di(meth)acrylate, 1,6-hexane diol di(meth)acrylate, polyethylene glycol di(meth)acrylate, 2,2-bis(4-(meth)acryloyloxypolyethylene-oxyphenyl)propane and 2,2-bis(4-(meth)acryloyloxypoly-propyleneoxyphenyl)propane, trifunctional monomers such as trimethylolpropane tri(meth)acrylate and trimethylolethane tri(meth)acrylate, tetrafunctional monomer such as pentaerythritol tetra(meth)acrylate, and hexafunctional monomers, such as dipentaerythritol hexa(meth)acrylate, can be cited.

As oligomers used in the present invention, for example, those which are polymerizable by irradiation by energetic radiation and have a weight average molecular weight of 500-50,000, can be cited; and in practice, an acrylate or methacrylate of an epoxy resin, an acrylate or methacrylate of a polyester resin, an acrylate or methacrylate of an polyether resin, an acrylate or methacrylate of a polybutadiene resin and a polyurethane resin having acrylic groups or methacrylic groups on its molecular terminals, can be cited.

Selection of the monomer and/or the oligomer may be determined by the necessary heat resistance, strength, molecular weight cut-off ability, etc., of the polymer membrane. For example, to obtain a polymer membrane with excellent heat resistance, polyfunctional monomers and/or oligomers are selected. In contrast, when no heat resistance is required, only monofunctional monomers and/or oligomers may be selected. Furthermore, to produce such a polymer membrane which can filter substances having relatively low molecular weights, it is preferable that polyfunctional monomers and/or oligomers be selected, and that the molecular weight between cross-links be small. In contrast, to produce a polymer membrane which can filter substances with relatively large molecular weights, it is preferable that monomers and/or oligomers with low functionalities and large molecular weights be selected to make the molecular weight between cross-links large.

As the non-solvent used in the present invention, any solvent that can homogeneously dissolve monomers and/or oligomers used in the present invention, and which does not swell or dissolve the polymers formed of these monomers and/or oligomers, can be used. For example, when a polyurethane resin with acrylic groups on the ends of the molecule is used as an oligomer, alkyl esters such as methyl caprate, and dialkyl ketones such as diisobutyl ketone, etc., are preferably used as the non-solvent. Solubility and boiling point of the non-solvent can be suitably selected depending on the kind of the monomer and/or the oligomer, the necessary molecular weight cut-off ability, and the necessary degree of structural asymmetry.

When a method of preparation is used in which a part of the non-solvent is evaporated, there are correlations between the evaporation of the non-solvent and the degree of the asymmetry of the structure. The degree of the asymmetry of the structure correlates with the molecular weight cut-off ability and the amount of permeation of a filtrate. Therefore, selection of the boiling point of the non-solvent is possibly one of the important factors determining the filtering characteristics of the obtained polymer membrane. One example related to the selection of boiling point of the non-solvent is that when a part of the non-solvent is evaporated at or below room temperature, and when the speed of the air flow blown on a polymerizable solution for evaporating a part of the solvent is low, or when the non-solvent should be evaporated in an extremely short time, a substance with a boiling point of 80 degrees C. or lower can be used as the non-solvent. In addition, when heated air is blown on the polymerizable solution, or when the non-solvent should be evaporated over a certain prolonged period, a substance with a boiling point of 60 degrees C. or higher can be used as the non-solvent. In addition, the non-solvent may be a mixture of two or more chemicals.

As the solvent used in the present invention, any solvent that can homogeneously dissolve monomers and/or oligomers, and can swell or dissolve polymers formed of these monomers and/or oligomers, may be used. For example, when a polyurethane resin with acrylic groups on its molecular ends is used as the oligomer, acetone, methyl ethyl ketone, ethyl acetate, dimethylformamide, n-methyl-pyrrolidone, etc., can be suitably used as the solvent. Solubility and boiling point of the solvent can be appropriately selected, depending on the kinds of the monomers and/or the oligomers, the necessary molecular weight cut-off ability, and the necessary degree of the asymmetry in the structure.

When a solvent is incorporated in a polymerizable solution, the range of solubility control is widened, and accordingly, the range of selection of non-solvents, polymerizable monomers and oligomers, and additives can be widened, and it thus becomes easier to improve membrane characteristics and to prepare a membrane in accordance with the desired use and purpose. In addition, it becomes easier to form a dense layer at an arbitrary position such as on the gas phase side, on the supporting body side or on the inner part of the membrane, by controlling the combination of boiling points of the non-solvent and the solvent.

As in the case of the boiling point of the non-solvent, selection of the boiling point of the solvent is also possibly one of the important factors determining filtering characteristics of the obtained polymer membrane, and it is necessary to select it based on the same considerations as in the case of the non-solvent. In addition, in many cases, there exists a correlation between the solubility of the solvent and the molecular weight cut-off ability of the obtained polymer membrane. To give one example, in order to obtain a polymer membrane which can filter substances with relatively small molecular weights, a solvent with a high solubility can be used. In addition, to obtain a polymer membrane which can filter substances with relatively large molecular weights, a solvent with a low solubility may be used.

The weight ratio of a non-solvent and solvent to the monomer and/or an oligomer is preferably in the range of 0.1–4.0 per monomer and/or oligomer. If it is 0.1 or less, a sufficient amount of permeation is not obtained, and if it is 4.0 or larger, the strength of the membrane will be insufficient.

As energetic rays used in the present invention, electron beams, gamma rays, X-rays, UV rays, visible rays, etc., may be used. Amount these rays, it is desirable to use UV rays because of the simplicity of the apparatus therefor the manipulation thereof. The strength of the irradiating UV rays is preferably 10–500 mW/cm$^2$, and the irradiation time is usually about 0.1–100 seconds. When UV rays and visible rays are used as the energetic rays, it is possible to incorporate photopolymerization initiator in the polymerizable solution to accelerate the rate of polymerization. In addition, it is possible to further accelerate the polymerization by performing the irradiation by UV rays under an inert gas. An electron beam is another preferred energy ray which may be used for the present invention. When an electron beam is used, since there is no absorption of UV rays by the solvent, the non-solvent, and the other additives, the range of selection of these substances is widened and the rate of membrane formation is also improved.

As a UV polymerization initiator which can be mixed with a polymerizable solution of the present invention, acetophenones such as p-tert-butyltrichloroacetophenone, 2,2-diethoxyacetophenone and 2-hydroxy-2-methyl-1-phenylpropane-1-one, ketones such as benzophenone, 4,4-bisdimethylaminobenzophenone, 2-chlorothioxantone, 2-methylthioxantone, 2-ethylthioxantone and 2-isopropylthioxantone, benzoin ethers such as benzoin, benzoin methyl ether, benzoin isopropyl ether and benzoin isobutyl ether, benzyl ketals such as benzyl dimethyl ketal and hydroxycyclohexyl phenyl ketone, can be cited.

As a method of transforming a polymerizable solution into a thin membrane in the present invention, a method of coating a supporting body with a polymerizable solution by means of a roll coating method, a doctor blade method, a spin coating method, a spray method, etc., may be used. As the supporting body, a metal, a ceramic, a glass, a plastic, a fabric, a non-woven fabric, a paper, etc., can be used. When a belt-like material is used as the supporting body, a continuous thin film can be formed. The membrane can eventually be peeled off of the supporting body; when the supporting body is porous, the product can be used integrated as it is. In addition, it is possible to use a method in which a thin membrane is formed without using a supporting body.

In the specification of the present invention, the phrase "having a pore diameter distribution in the depth of the membrane" means that a large number of pores of various diameters which vary continuously or discontinuously in the depth of the membrane. An example of the pore diameter distribution, in the case in which the pore diameters increase or decrease continuously from one surface of the membrane to the other surface thereof, is illustrated in FIG. 1. An example of the pore diameter distribution, in the case in which the pore diameters increase or decrease discontinuously from one surface of the membrane to the other surface thereof, is illustrated in FIG. 2. An example of the pore diameter distribution, in the case in which layers of pores having relatively small diameters exist near both surfaces of the membrane, and the pore diameters increase continuously or discontinuously from the surfaces of the membrane to the middle thereof, is illustrated in FIG. 3. An example of the pore diameter distribution, in the case in which there is a layer of pores having the smaller relative diameters at the middle of the membrane, and in which the pore diameters increase continuously or discontinuously from both sides of the middle pore layer to the surfaces of the membrane, is illustrated in FIG. 4.

The phrase "pores which communicate with one another" in the specification means that the pores are connected to permit the passage of liquid from one surface of the membrane to the other surface. When the liquid being filtered is water, a hydrophobic membrane with pores which communicate with one another will not permit water to pass through unless great pressure is applied to one side of the membrane.

However, such a membrane will permit the passage of water if the membrane is first dipped in an alcohol or an aqueous solution of a surfactant.

The shape of the pores which communicate with one another in the asymmetric polymer membrane according to the present invention is not limited. For example, the shape of the pores which communicate with one another may comprise gaps between spherical domains of polymers in contact with one another; this situation is illustrated in FIG. 5. Another example, in which the polymers form a sponge-like structure, is illustrated in FIG. 6.

As asymmetric polymer membrane of the present invention is a membrane that consists of a dense layer and a porous supporting layer.

It is desirable that the thickness of the dense layer be 5 micrometers or less. If the thickness is 5 micrometers or greater, the filtration speed is extremely low, and this is not practical. In addition, there is a practically attainable lower limit to the thickness of the membrane, but as there is no problem caused by the thinness of the membrane itself, there is no theoretical lower limit to the thickness of the membrane.

In addition, it is preferable that in the porous supporting layer, the pore diameter of the pores be 0.1-20 micrometers. If the pore diameter is 0.1 micrometer or less, the filtration speed is extremely low, and this is not practical. In addition, if the pore diameter is 20 micrometers or greater, the strength of the membrane is extremely low, and this is again not practical.

As described above, the dense layer and the porous supporting layer may be located on one surface of a membrane or on both surfaces thereof. Therefore, such a membrane having a dense layer inside and porous supporting layers on both surfaces, is to be included in the membranes of the present invention.

The membrane of the present invention has pores which communicate with one another, has pore diameters of 0.0005-20 $\mu$m in the dense layer, and is capable of allowing a liquid to pass through. When the pore diameters of the holes of the dense layer of the membrane are 0.0005-0.015 $\mu$m, the membrane has a molecular weight cut-off ability and can separate polymer substances, low molecular weight substances, or ions dissolved in a solvent, from the solvent. Therefore, in this case, the membrane is suitable as an ultrafiltration membrane, a reverse osmosis membrane, etc.

The assessment as to whether the pore diameter of holes in the dense layer is not to be less than 0.0005 $\mu$m can be performed by noting whether the following separation factor of oxygen and nitrogen is in the range of 0.9-1.1. The assessment as to whether the pore diameters of holes in the dense layer are not greater than 0.015 $\mu$m or not, can be performed by a filtration test using a substance with an apparent diameter, such as a protein or the like. When the pore diameters of holes of the dense layer of the membrane are 0.02-20 $\mu$m, the membrane does not have a molecular weight cut-off ability and allows polymer substances, low molecular weight substances, and ions to pass through. Therefore, in this case, the membrane is suitable as a microfiltration membrane, etc. The assessment as to whether the pore diameters of holes in the dense layer are not less than 0.02 $\mu$m can be performed by a filtration test using a substance with an apparent diameter, such as a microbe. The assessment as to whether the pore diameter is not greater than 20 $\mu$m can be performed by electron microscopic observations.

In addition, as the membrane of the present invention has a separation factor of 0.9 to 1.1 and the permeation rates of oxygen and nitrogen are at the same level, the membrane has no gas separation ability. If the pore diameters of the holes in the dense layer of the membrane are less than 0.0005 $\mu$m, a gas may pass through the membrane according to the dissolution-diffusion principle. The separation factor thereof depends on the material of the membrane; however, it is generally not less than 2. When the pore diameters of the pores which communicate with one another in the dense layer are not less than 0.0005 $\mu$m, a gas moves through the membrane according to the Knudsen flow or the Poiseuille flow. The separation factor thereof is 0.9 to 1.1 ("An Outline of Membrane Treatment Technique", Vol. 1, 1991, page 24, supervised by Masayuki Nakagaki, Fuji Techno System).

Furthermore, the ratio of the pore diameter in the dense layer to the mean pore diameter of the entire membrane is in a range of $10^{-6}$ to $10^{-1}$ in the membrane of the present invention.

In addition, the density of the pores in the membrane of the present invention, that is, the void content, is preferably 10-70%. If the void content is 10% or less, the filtration speed is extremely low, and this is not practical. In addition, if it exceeds 70%, the strength of the membrane is extremely low, and this is again not practical.

The present inventors found that there were various methods for polymerizing a polymerizable solution into a porous thin membrane having an pore diameter distribution in the thickness direction of the membrane by irradiation with an energy ray.

A method can be cited in which after a polymerizable solution is formed into a thin membrane and a part of a non-solvent is evaporated, the thin membrane is irradiated with an energy ray; another method can be cited in which a solvent is incorporated in a polymerizable solution and after a part of this solvent and/or a non-solvent is evaporated, this thin membrane is irradiated with an energy ray; and yet another method can be cited in which after a polymerizable solution is formed into a thin membrane, this membrane is irradiated with an energy ray while a temperature gradient is provided in the thickness direction of the membrane.

In order to evaporate a part of a solvent or a non-solvent, methods may be chosen such as a method in which air, nitrogen, or an inert gas is blown on a polymerizable solution of a thin membrane-like condition; a method in which drying is performed for a specified time without blowing a gas over the membrane; and a method in which infrared rays are used. In order to evaporate selectively a portion of the solvent or the non-solvent, the evaporation is performed by selecting substances, each having a different boiling point.

When no temperature gradient exists and a non-solvent, or both the non-solvent and the solvent, is nonvolatile, that is, under a condition in which the non-solvent or the solvent is not evaporated, an asymmetric structure is not formed. In addition, under a condition in which the non-solvent or the solvent is completely evaporated without any trace, only a non-porous homogeneous membrane or a symmetric porous membrane is obtained by radiation curing. An asymmetric membrane consisting of a dense layer and a porous supporting layer cannot be obtained until a portion of a solvent or a non-solvent is evaporated.

In the present method, it is possible to easily introduce a cross-linked structure on a membrane (in comparison with other methods for preparing an asymmetric membrane such as wet methods and others) and to realize an extremely high production speed by evaporation in an extremely short time and to produce phase separation substantially and spontaneously. In addition, in comparison with a freezing method, a high flux based on a thin dense layer, a high pressure-resistant strength resulting from a not-too-large pore diameter in a porous supporting layer, and a high production speed, can be realized.

As a method for providing a temperature gradient, a method in which a temperature of a supporting body and an atmospheric temperature or a gas flow temperature are made to differ from each other, and a method by means of infrared heating, may be used.

A method of preparation in which an asymmetric structure is introduced by irradiating with energetic radiation under a condition in which a temperature gradient is provided to a polymerizable solution has features exhibiting superior production speed and reproducibility over a method in which irradiation with energetic radiation is performed after a part of a solvent or a non-solvent is evaporated.

The reason why and the mechanism by which a porous thin membrane with a pore diameter distribution in the thickness direction of the membrane is obtained in the present invention has not yet been solved; however, it is hypothesized that the reason is that an nonhomogeneous phase separation is produced in the thickness direction of the membrane by irradiating with antinic radiation under a condition in which a concentration distribution of a monomer and/or a oligomer or a distribution of a concentration ratio of the non-solvent to the solvent is formed by evaporating a part of the monomer and/or the oligomer and under a condition in which a temperature gradient is formed in the thickness direction of the membrane.

In addition, it is estimated that when a thin membrane of a polymerizable solution is formed on a supporting body, evaporation of a non-solvent or a solvent from only one face of the polymerizable solution and difference in compatibility between each ingredient of the polymerizable solution and the supporting body contribute to generate the asymmetric pore diameter distribution.

It is necessary that after polymerization is finished by irradiating with an energy ray, a non-solvent and a solvent are removed by means of evaporation and/or washing. For the washing, a washing agent which can dissolve thoroughly the non-solvent, the solvent, unreacted monomers and/or oligomers and a UV polymerization initiator and does not swell or dissolve a polymer can be used and a cleaning agent with a low boiling point is preferable. In addition, the cleaning can be performed in a plurality of processes using a plurality of cleaning agents.

As an asymmetric polymer membrane of the present invention exhibits high filtration rate, excellent strength, heat resistance, and chemical resistance, it is possible to apply it effectively to an ultrafiltration membrane, a reverse osmosis membrane, a precision filtration membrane, etc.

DESCRIPTION OF THE PREFERRED EMBODIMENTS OF THE INVENTION

Figure 1:
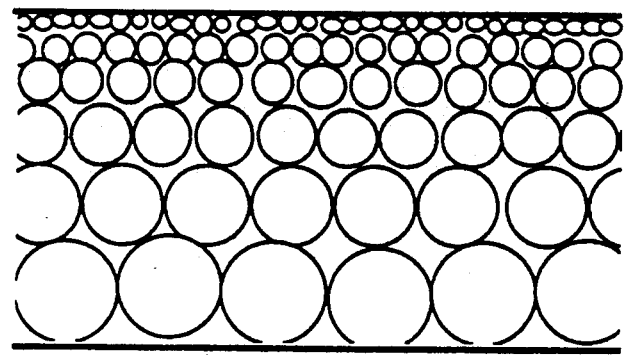
FIGS. 1–4 are enlarged sectional views showing a membrane structure having a pore diameter distribution in the thickness direction of the membrane according to the invention. The inside of the circles in these FIGURES represent hole portions in the membrane.
Figure 2:
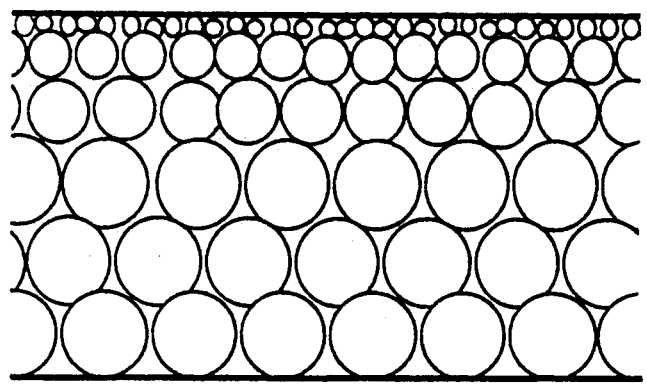
Figure 3:
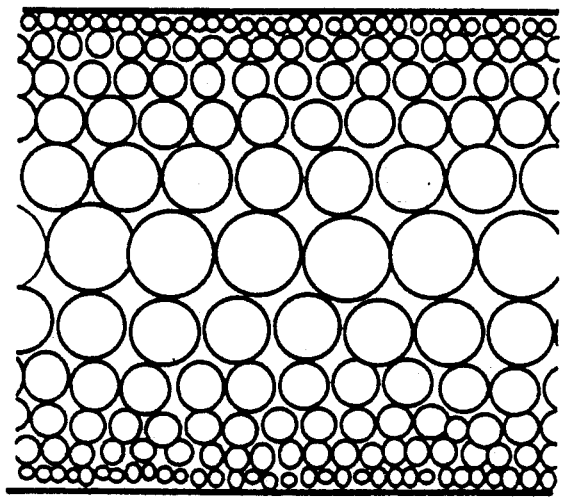
Figure 4:
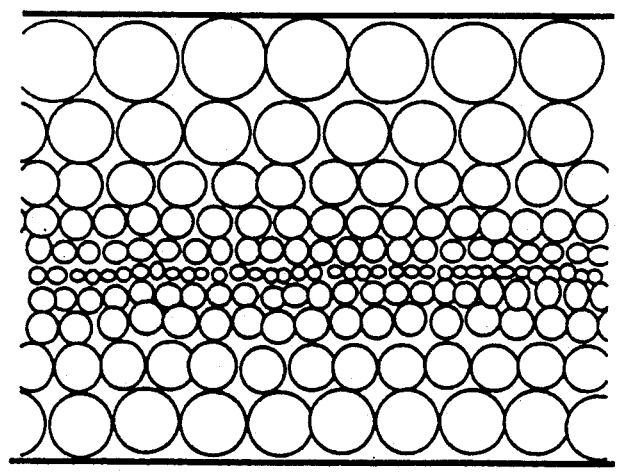
Figure 5:
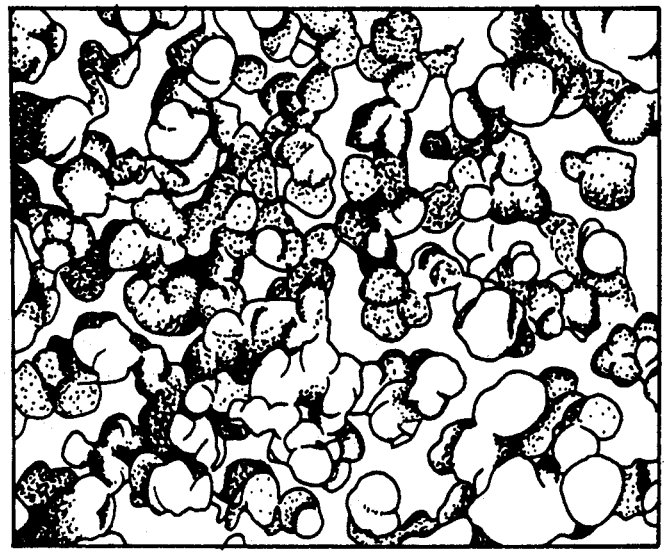
FIGS. 5 and 6 are drawings taken from electron micrographs showing Examples of the shape of pores which communicate with one another according to the present invention.
Figure 6:
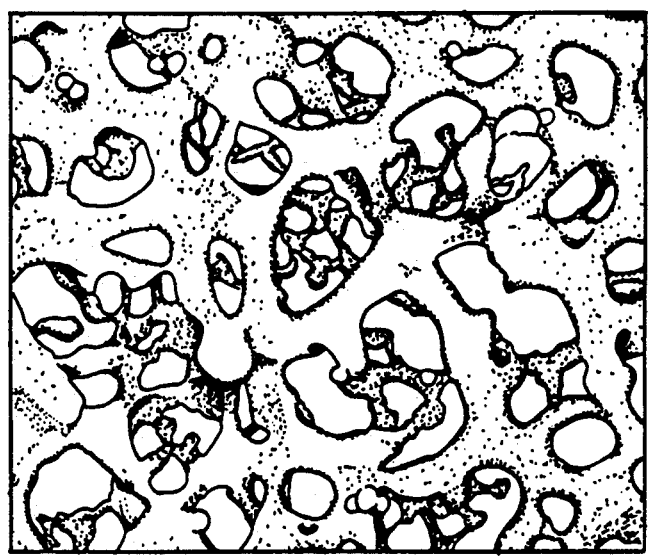

Hereinbelow, the present invention will be explained in detail, but the range of the present invention is not restricted to these examples. "Parts" in the examples refer to parts by weight.

EXAMPLE 1

Preparation of a polymerizable solution

A polymerizable solution 1 was obtained by mixing 100 parts urethane acrylate oligomer with a number average molecular weight of 1,000 and three acrylic groups on average per molecule, 4 parts UV polymerization initiator Irgacure-651 (manufactured by Ciba-Geigy Co., Ltd.) and 70 parts diisobutyl ketone (a non-solvent).

Preparation of an asymmetric polymer membrane

A glass plate was coated with the polymerizable solution 1 by means of a film applicator so as to obtain a thickness of 200 micrometers. After a part of the non-solvent was evaporated by keeping the glass plate under a nitrogen flow for 2 minutes, the coating was irradiated with a UV ray having a wavelength of 360 nm and a strength of 100 mW/cm$^2$ for 10 seconds by means of a metal halide lamp. It was observed that the coating film which was transparent before irradiation became opaque and white after irradiation. The obtained opaque white membrane was peeled off from the glass plate and the non-solvent, unreacted monomer and oligomer, and the UV polymerization initiator were washed out by immersion in petroleum ether for 30 minutes. By thoroughly drying the membrane after cleaning, an asymmetric polymer membrane 1 with a luster on the glass plate side and no luster on the side brought into contact with the nitrogen flow was obtained.

By observing the polymer membrane 1 by means of an electron microscope, it was found that the pore diameter on the glass plate side was about 0.01 micrometer, while the pore diameter on the side brought into contact with the nitrogen flow was about 2 micrometers. In addition, by observing a cross-section, it was found that a part with smaller pore diameters only existed in an extremely thin layer on the glass plate side, and the thickness was 1 micrometer or less. The separation factor of oxygen/nitrogen was 0.980.

Evaluation of filtration characteristics

A filtration experiment of a 0.3% aqueous solution of polyethylene glycol with a molecular weight of 50,000 was performed by using an ultrafiltration apparatus SM-165-26 manufactured by Zaltrius Co., Ltd. Flux (transmittance) with a polyethylene glycol aqueous solution; rejection results of polyethylene glycol at a filtration temperature of 25 degrees C. and under a filtration pressure of 3 kg/cm$^2$ are shown in Table 1. The same evaluations were performed in the following Examples and Comparative Examples.

EXAMPLE 2

Preparation of a polymerizable solution

A polymerizable solution 2 was obtained by mixing 60 parts urethane acrylate oligomer with a number average molecular weight of 3,000 and three acrylic groups on average per molecule, 20 parts 1,6-hexane diol diacrylate, 4 parts Irgacure-651 (a UV polymerization initiator manufactured by Ciba-Geigy Co., Ltd.), 20 parts diisobutyl ketone (a non-solvent), and 70 parts methyl caprate (a non-solvent).

Preparation of an asymmetric polymer membrane

By performing the same procedures as in Example 1, an asymmetric polymer membrane 2 with a luster on the glass plate side and no luster on the side brought into contact with the nitrogen flow was obtained. Results of observations by means of an electron microscope were the same as those in Example 1. In addition, the separation factor of oxygen/nitrogen was 0.935.

EXAMPLE 3

Preparation of a polymerizable solution

A polymerizable solution 3 was obtained by mixing 50 parts urethane acrylate oligomer with a number average molecular weight of 1,000 and two acrylic groups on average per molecule, 30 parts acrylate of an epoxy resin with an epoxy equivalent of 190, 20 parts phenylcellosolve acrylate, 4 parts Irgacure-184 (a UV polymerization initiator manufactured by Ciba-Geigy Co., Ltd.), 70 parts methyl caprate (a non-solvent), and 30 parts acetone (a solvent).

Preparation of an asymmetric polymer membrane

A glass plate was coated with the polymerizable solution 3 by means of a film applicator so as to obtain a thickness of 200 micrometers. After a part of the solvent was evaporated by keeping the glass plate under a nitrogen flow for 30 seconds, the coating was irradiated with a UV ray having a wavelength of 360 nm and a strength of 100 mW/cm$^2$ for 10 seconds from a metal halide lamp. It was observed that the coating film which was transparent before irradiation became opaque and white after irradiation. The obtained opaque white membrane was peeled off from the glass plate and the non-solvent, solvent, unreacted monomer and oligomer, and the UV polymerization initiator were washed out by immersion in petroleum ether for 30 minutes. By thoroughly drying the membrane under a vacuum after cleaning, an asymmetric polymer membrane 3 with a luster on the glass plate side and no luster on the side brought into contact with the nitrogen flow was obtained.

Results of observations by means of an electron microscope were the same as in Example 1. In addition, the separation factor of oxygen/nitrogen was 0.936.

EXAMPLE 4

Preparation of a polymerizable solution

A polymerizable solution 4 was obtained by mixing 60 parts urethane acrylate oligomer with a number average molecular weight of 3,000 and two acrylic groups on average per molecule, 20 parts trimethylolpropane triacrylate, 20 parts neopentyl glycol diacrylate, 4 parts Irgacure-651 (a UV polymerization initiator manufactured by Ciba-Geigy Co., Ltd.), 70 parts methyl laurate (a non-solvent), and 30 parts methyl isobutyl ketone (a solvent).

Preparation of an asymmetric polymer membrane

A polymer membrane 4 with a luster on the side brought into contact with the nitrogen flow and no luster on the glass plate side was obtained by the same method as in Example 3. By observing the polymer membrane 4 by means of an electron microscope, it was found that the pore diameter on the glass plate side was about 2 micrometers and the pore diameter on the side brought into contact with the nitrogen flow was about 0.01 micrometer. In addition, it was found by observation of the cross-section of the membrane that only an extremely thin layer on the side brought into contact with the nitrogen flow had pores of a small diameter. In addition, the separation factor of oxygen/nitrogen was 1.02.

EXAMPLE 5

Preparation of a polymerizable solution

A polymerizable solution 5 was obtained by altering the amount of methyl caprate (a non-solvent) in the polymerizable solution 3 of Example 3 to 80 parts.

Preparation of an asymmetric polymer membrane

An asymmetric polymer membrane 5 with a luster on the glass plate side and no luster on the side brought into contact with the nitrogen flow was obtained by the same method as in Example 3. Results of observations by means of an electron microscope were the same as those of Example 1. The separation factor of oxygen/nitrogen was 0.936.

EXAMPLE 6

Preparation of a polymerizable solution

A polymerizable solution 6 was obtained by mixing 60 parts urethane acrylate oligomer with a number average molecular weight of 3,000 and three acrylic groups on average per molecule, 20 parts 1,6-hexane diol diacrylate, 4 parts Irgacure-651 (a UV polymerization initiator manufactured by Ciba-Geigy Co., Ltd.), and 70 parts methyl caprate (a non-solvent).

Preparation of an asymmetric polymer membrane

A glass plate was coated with the polymerizable solution 6 by means of a film applicator so as to obtain a thickness of 200 micrometers. After keeping the glass plate under a nitrogen flow at 80 degrees C. for 3 seconds, the coating was irradiated with a UV ray having a wavelength of 360 nm and a strength of 100 mW/cm$^2$ for 10 seconds by means of a metal halide lamp. It was observed that the coating film which was transparent before irradiation became opaque and white after irradiation. The obtained opaque white membrane was peeled off from the glass plate and the non-solvent solvent, unreacted monomer and oligomer and the UV polymerization initiator were washed out by immersion in petroleum ether for 30 minutes. By thoroughly drying the membrane under a vacuum after cleaning, an asymmetric polymer membrane 6 with a luster on the side brought into contact with the nitrogen flow and no luster on the glass plate was obtained. Results of observations by means of an electron microscope were the same as in Example 4. In addition, the separation factor of oxygen/nitrogen was 0.936.

EXAMPLE 7

Preparation of a polymerizable solution

A polymerizable solution 7 was obtained by mixing 80 parts urethane acrylate oligomer with a number average molecular weight of 1,000 and three acrylic groups on average per molecule, 20 parts dicyclopentenyl acrylate, 4 parts Irgacure-651 (a UV polymerization initiator manufactured by Ciba-Geigy Co., Ltd.), 200 parts methyl caprate (a non-solvent), and 20 parts acetone (a solvent).

Preparation of an asymmetric polymer membrane

A polymer membrane 7 with a luster on the glass plate side and no luster on the side brought into contact with the nitrogen flow was obtained by the same method as in Example 1. By observing the polymer membrane 7 by means of an electron microscope, it was found that the pore diameter on the glass plate side was about 0.2 micrometer and the pore diameter on the side brought into contact with the nitrogen flow was about 5 micrometers. In addition, it was found from an examination of the cross-section that only an extremely thin layer on the glass plate side had pores with a small diameter. In addition, the separation factor of oxygen/nitrogen was 0.934.

COMPARATIVE EXAMPLE 1

The polymerizable solution 1 of Example 1 under a condition in which it was sandwiched between two glass plates with a spacer having a thickness of 200 micrometers was irradiated with a UV ray of a wavelength of 360 nm and a strength of 100 mW/cm$^2$ for 10 seconds from a metal halide lamp. It was observed that the polymerizable solution which was transparent before irradiation became opaque and white after irradiation.

The obtained opaque white membrane was peeled off from the glass plate and was immersed in petroleum ether for 30 minutes to wash out the non-solvent, unreacted monomer and oligomer and the UV polymerization initiator. A polymer membrane 7 with no luster on both surfaces was obtained by thoroughly drying the membrane after cleaning under vacuum. By observing the polymer membrane 7 by means of an electron microscope, it was found that both faces had pore diameters of about 2 micrometers, and that the pore diameter was uniform in the thickness direction of the membrane, electron microscopic observation of a cross-section.

COMPARATIVE EXAMPLE 2

Using the polymerizable solution of Example 3, a polymer membrane 8 with no luster on both faces was obtained by the same method as in Comparative Example 1. Results of observations by means of an electron microscope were the same as those of Comparative Example 1.

COMPARATIVE EXAMPLE 3

A glass plate was coated with the polymerizable solution 6 of Example 6 by means of a film applicator so as to obtain a thickness of 200 micrometers. The glass plate was irradiated with a UV ray with a wavelength of 360 nm and a strength of 100 mW/cm$^2$ for 10 seconds by means of a metal halide lamp. It was observed that the coating film which was transparent before irradiation became opaque and white after irradiation. The obtained opaque white membrane was peeled off from the glass plate and was immersed in petroleum ether for 30 minutes to wash out the non-solvent, unreacted monomer and oligomer and the UV polymerization initiator, resulting in a polymer membrane 9 with no luster on both faces. Results of observations by means of an electron microscope were the same as those of Comparative Example 1.

COMPARATIVE EXAMPLE 4

Preparation of a polymerizable solution

A polymerizable solution 7 was obtained by altering the fraction of the non-solvent methyl caprate in the polymerizable solution 6 of Example 6 to 60 parts.

Preparation of a polymer membrane

A polymer membrane 10 with luster on both faces was obtained by the same method as in Comparative Example 3. By observing the polymer membrane 10 means of an electron microscope, it was found that both upper and lower faces each had pore diameters of about 0.01 micrometer, and the pore diameter was uniform in the thickness direction of the membrane by observation of a cross-section.

COMPARATIVE EXAMPLE 5

Preparation of a polymerizable solution

A polymerizable solution 8 was obtained by altering the fraction of the non-solvent methyl caprate in the polymerizable solution 6 of Example 6 to 80 parts.

Preparation of a polymer membrane

A polymer membrane 11 was obtained by the same method as that of Comparative Example 3. Results of observation by means of an electron microscope were the same as those for Comparative Example 1.

COMPARATIVE EXAMPLE 6

Preparation of a polymerizable solution

A polymerizable solution 9 was obtained by mixing 90 parts hydroxyethyl methacrylate, 10 parts ethylene glycol dimethacrylate, 4 parts Darocure-2959 (a UV polymerization initiator), 65 parts water, and 15 parts ethylene glycol.

Preparation of an asymmetric polymer membrane

Under a condition in which the polymerizable solution 9 was sandwiched between two glass plates having a spacer with a thickness of 400 micrometers, a lower glass plate was cooled to $-40$ degrees C. After the polymerizable solution 9 was frozen by cooling, a glass cell in which water at 20 degrees C. was circulated was placed on the upper glass plate so as to melt the upper surface of the frozen polymerizable solution 9. Under this condition, the solution was irradiated with an ultraviolet ray with a wavelength of 360 nm and a strength of 100 mW/cm$^2$ for 10 seconds by means of a metal halide lamp positioned above the upper glass plate. Then, the obtained membrane was unfrozen and was peeled off from the glass plate to obtain an opaque white polymer membrane 12. By observing the polymer membrane 12 by means of an electron microscope, it was found that the upper face of the membrane had a pore diameter of 0.01 micrometer or less and the lower face of the membrane had a pore diameter of about 100 micrometers. In addition, it was found from the result of observation of a cross-section that the thickness of the part in which the pore diameter of the upper face of the membrane was 0.01 micrometer was about 50 micrometers.

Evaluation of filtration characteristics

On the polymer membrane 12, evaluation of filtration characteristics was impossible as a polyethylene glycol aqueous solution did not pass through, even under a filtration pressure of 3 kg/cm².

In Examples 1 and 2, asymmetric polymer membranes were obtained by evaporation of diisobutyl ketone which was a non-solvent. In Examples 3, 4, 5 and 7, asymmetric polymer membranes were obtained by evaporation of acetone and methyl isobutyl ketone which were solvents. In addition, in Example 6, phase separation on the surface of the membrane was not promoted by heating the surface of the membrane with a nitrogen flow at 80 degrees C. to obtain an asymmetric polymer membrane.

A polymer membrane with a pore diameter distribution in the cross-sectional direction of the membrane was not obtained in the Comparative Examples because in the Comparative Examples 1 and 2, evaporation of diisobutyl ketone did not occur as the polymerizable solution was sandwiched between glass plates and in Comparative Examples 3, 4 and 5, evaporation of non-solvent did not occur as the non-solvent was methyl caprate alone with a high boiling point.

It is clear from Table 1 that asymmetric polymer membranes in Examples 1–6 exhibited good filtration rates and molecular weight cut-off ability. In addition, the asymmetric polymer membrane in Example 7 could remove large substances with a diameter of 0.2 micrometer or larger and exhibited large filtration rates. The polymer membranes in Comparative Examples 1–5 which did not have a pore diameter distribution in the thickness direction of the membrane did not exhibit both excellent filtration rate and molecular weight cut-off ability at the same time. In addition, as is clearly shown in Comparative Examples 3, 4 and 5, even if the pore diameter of the membrane was controlled by changing the ratio of monomer and oligomer to non-solvent, it was impossible to obtain both excellent filtration rate and molecular weight cut-off ability at the same time.

In comparative Example 7, asymmetric polymer membranes were obtained; however, the dense layer was so thick that sufficient flux was not possible.

TABLE 1

|  | Flux (l/m²·hr) | Rejection (%) |
| --- | --- | --- |
| Example 1 | 25 | 80 |
| Example 2 | 27 | 80 |
| Example 3 | 30 | 89 |
| Example 4 | 26 | 85 |
| Example 5 | 35 | 80 |
| Example 6 | 25 | 90 |
| Example 7 | 30000 | 0 |
| Comparative Example 1 | 28 | 35 |
| Comparative Example 2 | 32 | 20 |
| Comparative Example 3 | 33 | 50 |
| Comparative Example 4 | 0 | — |
| Comparative Example 5 | 250 | 0 |

What is claimed is:

1. A method for preparing an asymmetric polymer membrane having a pore diameter gradient in the depth of the membrane, comprising the steps, in the following order, of:
    providing a homogeneous polymerizable solution including at least one member of the group consisting of a monomer and an oligomer, the member forming a crosslinked polymer upon exposure to energetic radiation; and a solvent for the monomer or oligomer which does not dissolve and does not swell the polymer;
    forming a layer of the homogeneous polymerizable solution;
    evaporating a portion of the solvent from the layer of the homogeneous solution; and
    forming said polymers substantially soley by irradiating the layer of the homogeneous solution with energetic radiation.

2. A method for preparing an asymmetric polymer membrane having a pore diameter gradient in the depth of the membrane, comprising the steps, in the following order, of:
    providing a homogeneous polymerizable solution including at least one member of the group consisting of a monomer and an oligomer, the member forming a crosslinked polymer upon exposure to energetic radiation; and a solvent for the monomer or oligomer which does not dissolve and does not swell the polymer;
    forming a layer of the homogeneous polymerizable solution and
    exposing the layer of the homogeneous solution to a temperature gradient while forming said polymers substantially soley by irradiating the layer of the homogeneous solution with energetic radiation.

3. A method for preparing an asymmetric polymer membrane as defined in claims 1 or 2, wherein the step of providing a homogeneous polymerizable solution further comprises including a second solvent which swells or dissolves the polymer.

4. An asymmetric polymer membrane comprising a polymer having a crosslinked structure formed by polymerizing at least one of a monomer and an oligomer polymerized substantially solely by exposure to radiation, the polymer membrane having continuous pores, a gradient of pore diameters from one face of the membrane to the opposing face of the membrane and a ratio of a permeability flux of oxygen to a permeability flux of nitrogen of 0.9–1.1.

5. An asymmetric polymer membrane as defined in claim 4 further comprising a porous, dense layer in the membrane including pores having the smallest diameters, the dense layer having a thickness of at most 5 μm.

6. An asymmetric polymer membrane as defined in claim 4 further comprising a porous, supporting layer in the membrane including pores having the largest diameters, the largest pores having a diameter of 0.1 to 20 μm.

7. An asymmetric polymer membrane as defined in claim 4, wherein the smallest pores have a diameter of 0.0005–0.015 μm, whereby the polymer membrane has a molecular weight cut-off ability.

8. An asymmetric polymer membrane as defined in claim 4, wherein the smallest pores have a diameter of 0.2–20 μm.

* * * * *